Feb. 25, 1958 H. P. TROENDLY ET AL 2,824,636
ONE-WAY CLUTCH
Filed Sept. 11, 1953 8 Sheets-Sheet 4

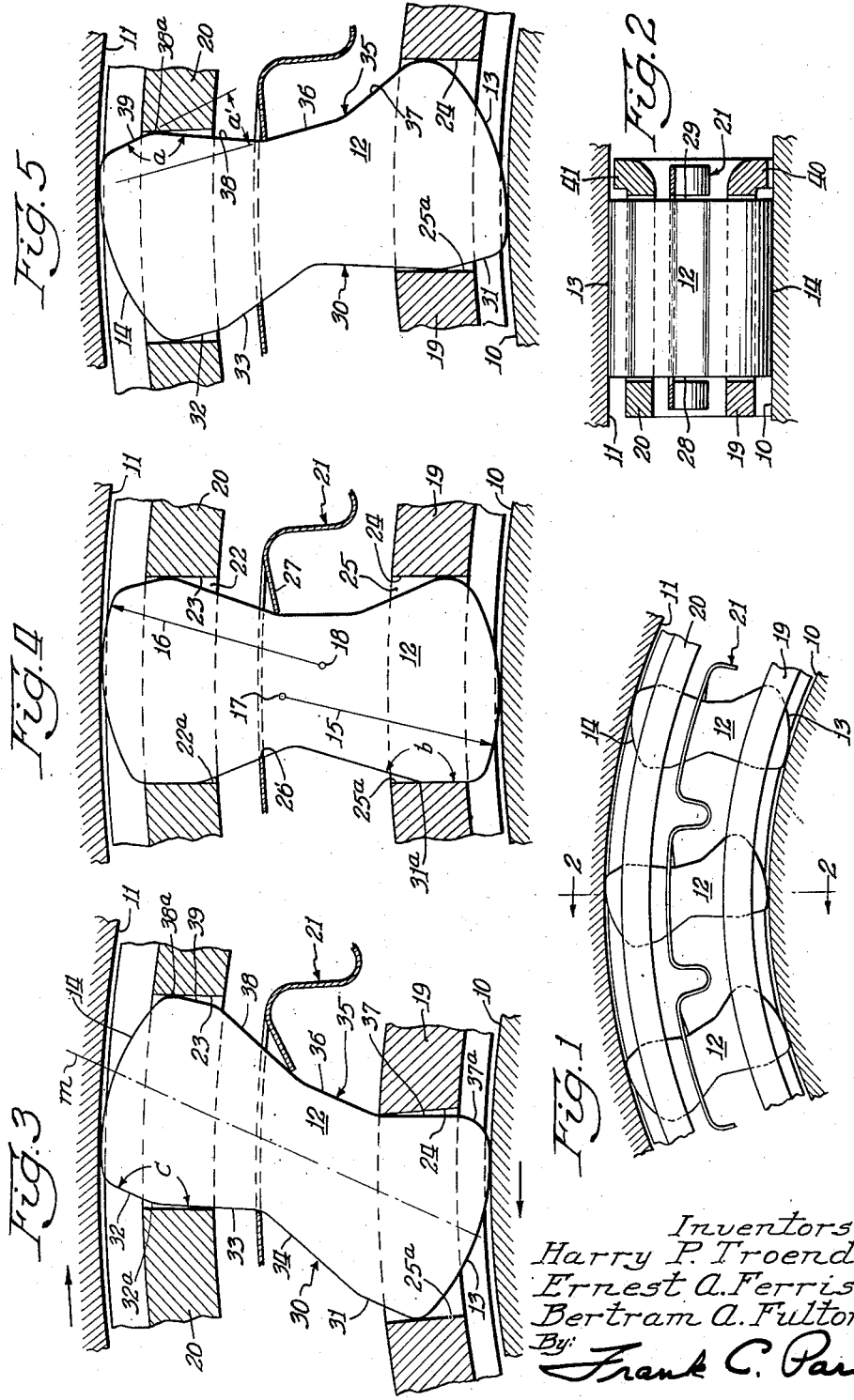

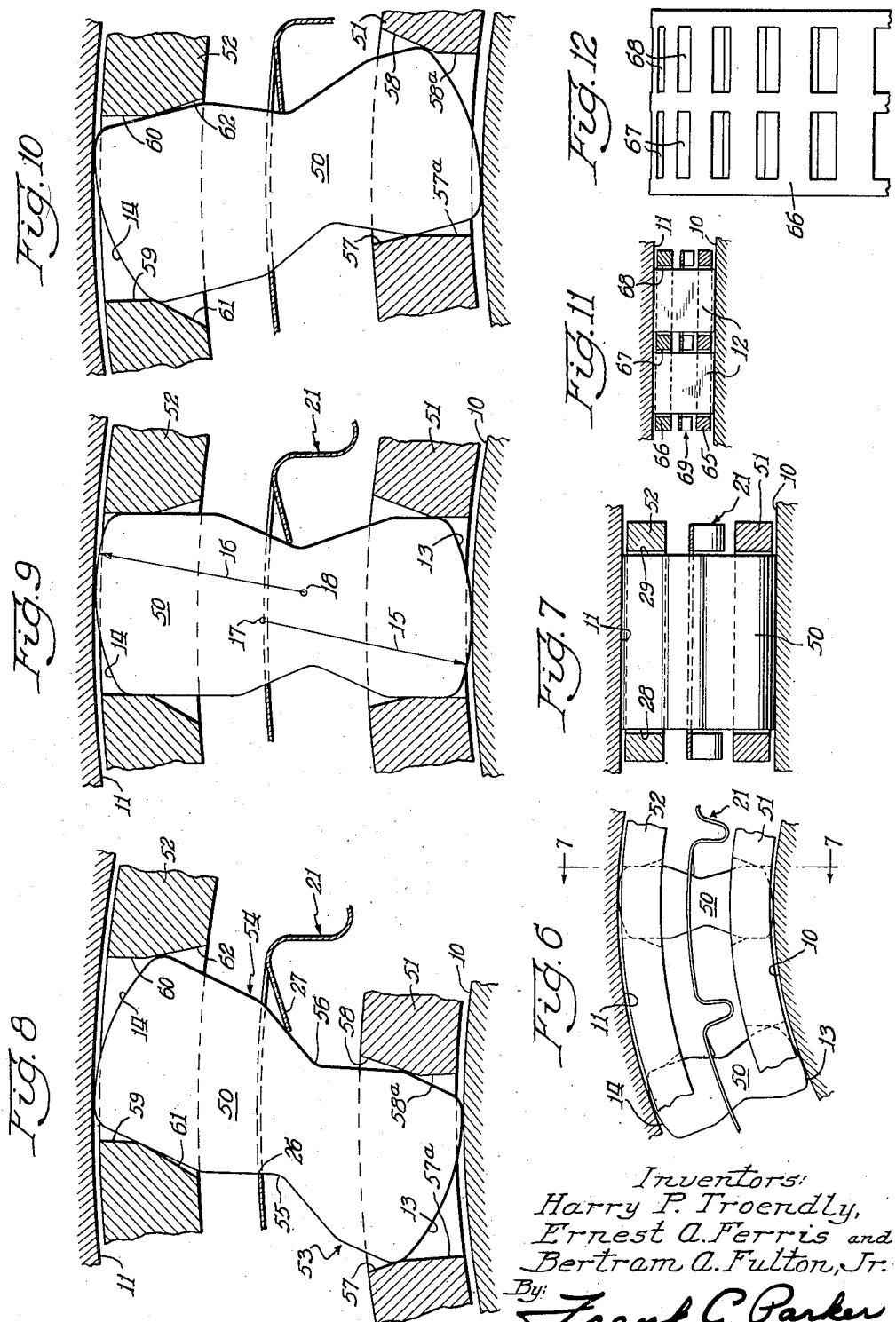

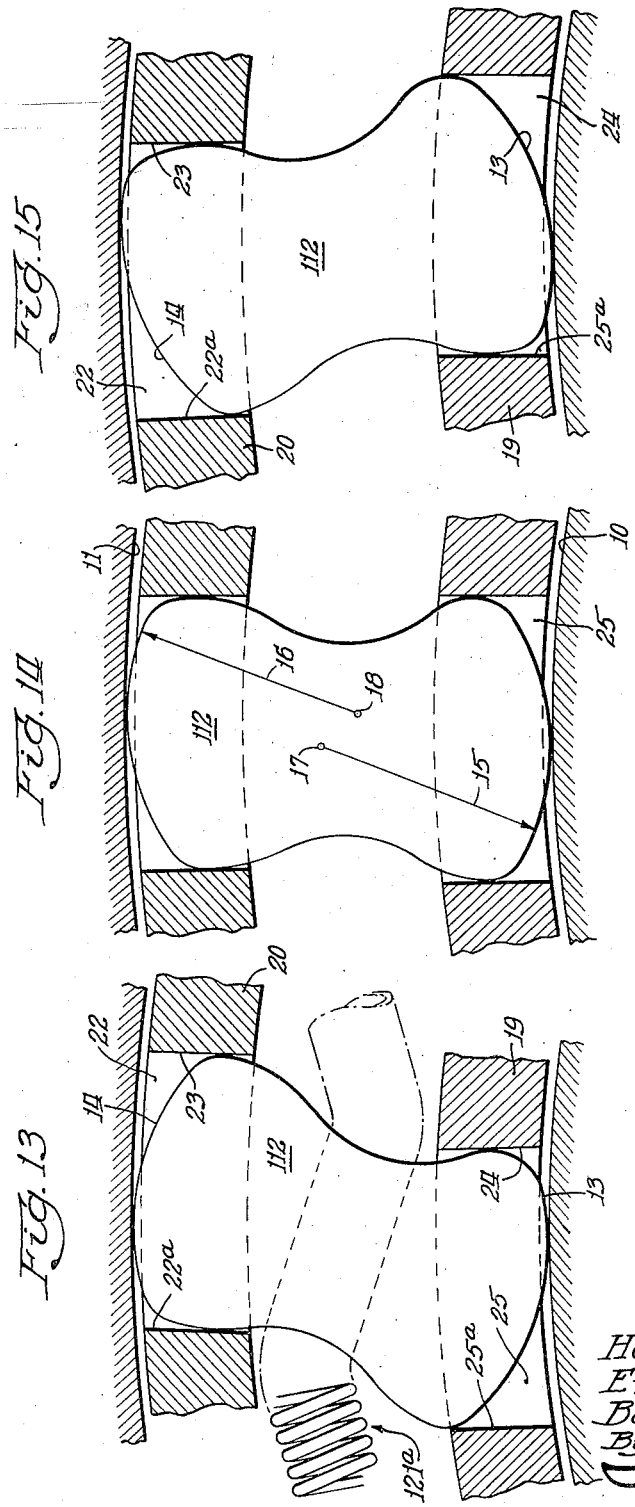

Inventors:
Harry P. Troendly,
Ernest A. Ferris and
Bertram A. Fulton, Jr.
By: Frank C. Parker
Atty.

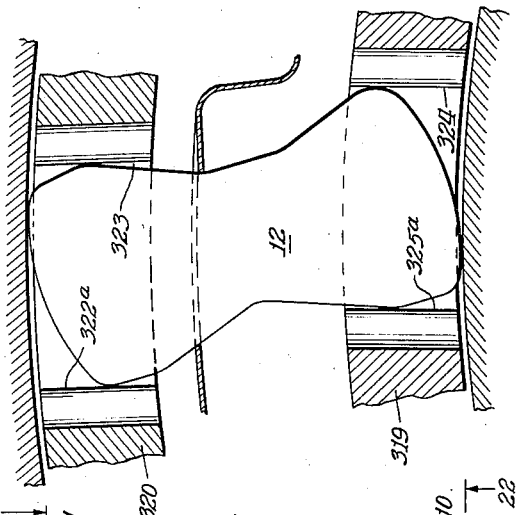
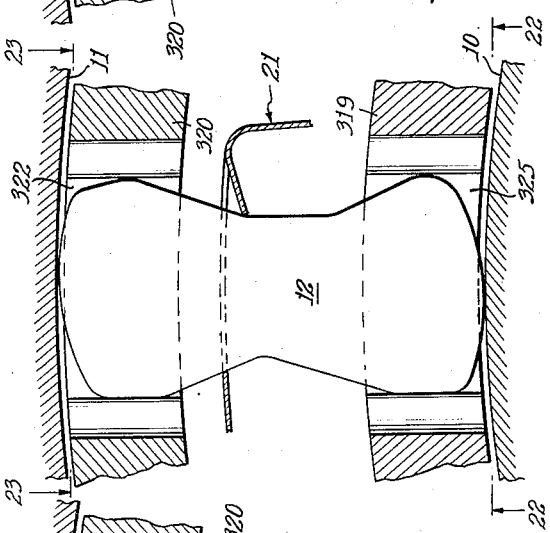
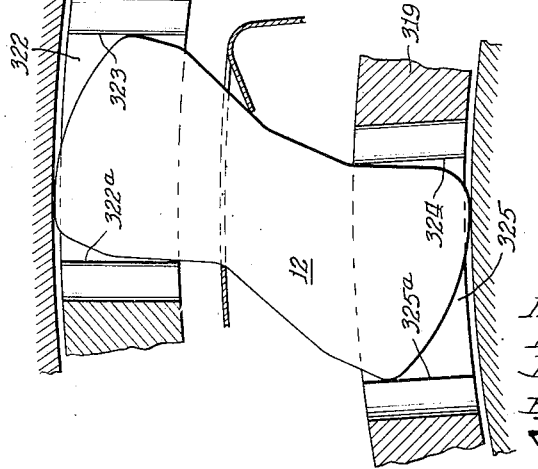
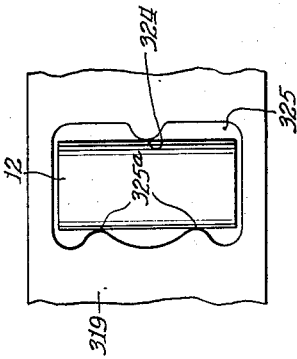
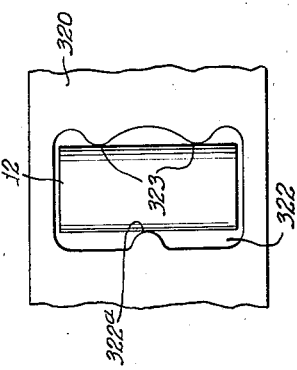
Inventors:
Harry P. Troendly,
Ernest A. Ferris and
Bertram A. Fulton, Jr.
By: Frank C. Parker
Atty.

Feb. 25, 1958     H. P. TROENDLY ET AL     2,824,636
ONE-WAY CLUTCH

Filed Sept. 11, 1953                                                  8 Sheets-Sheet 7

Inventors:
Harry P. Troendly,
Ernest A. Ferris and
Bertram A. Fulton, Jr.
By: Frank C. Parker
Atty.

Feb. 25, 1958     H. P. TROENDLY ET AL     2,824,636
ONE-WAY CLUTCH
Filed Sept. 11, 1953     8 Sheets-Sheet 8
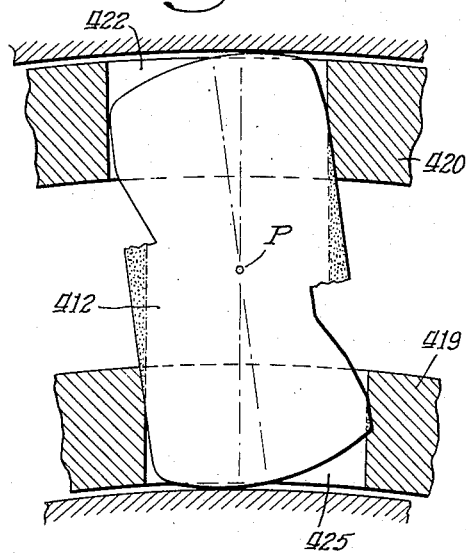
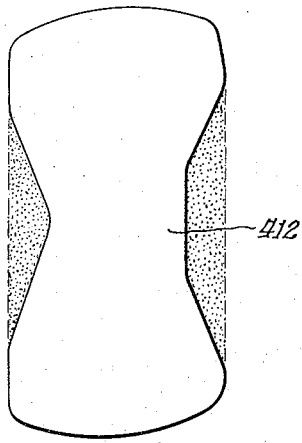
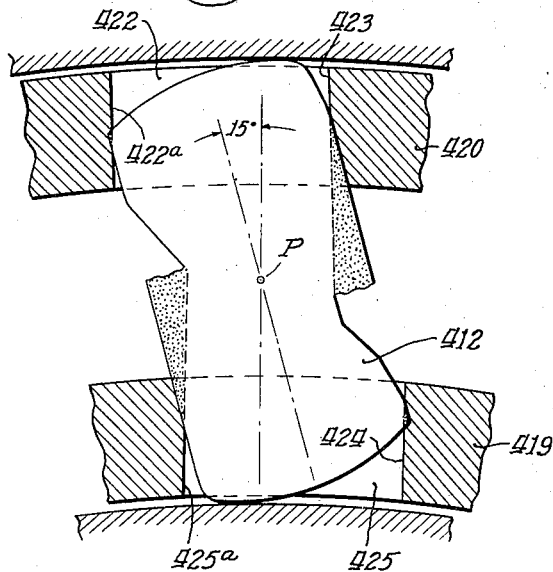
Inventors:
Harry P. Troendly,
Ernest A. Ferris and
Bertram A. Fulton, Jr.
By: Frank C. Parker
Atty.

2,824,636

ONE-WAY CLUTCH

Harry P. Troendly, La Grange Park, Ernest A. Ferris, Elmhurst, and Bertram A. Fulton, Jr., Glen Ellyn, Ill., assignors to Borg-Warner Corporation, Chicago, Ill., a corporation of Illinois Application September 11, 1953, Serial No. 379,534

36 Claims. (Cl. 192—45.1)

The present invention relates to one-way engaging devices and more particularly to one-way clutches of the sprag type, effective to transmit rotary power in one direction only.

A clutch of this type drives or transmits torque when the speed of the driving race equals that of the driven race and free wheels when the speed of the driving race is less than that of the driven race. This type of clutch includes sprags or grippers having oppositely and eccentrically disposed incomplete cylindrical terminal surfaces adapted to wedgingly engage between a pair of radially spaced concentric races, upon tilting of the grippers in one direction, for connecting said races together in torque transmitting relation and to disconnect said races upon tilting of the grippers in the opposite direction.

Our work in the field of one-way clutches over a considerable period of years has revealed to use that one-way clutches as they have been known heretofore, have been very erratic in performance.

Many of the difficulties with one-way clutches and their application, we have found, in the light of our experience arose from a lack of appreciation of the action of one-way clutches under severe conditions such as torsional vibration, shock loading, and sub-zero temperature operation. Research along this line, with the aid of high speed motion pictures, has opened up new approaches and we have succeeded in working out and disclose herein the answers to many of the failures experienced in one-way clutches in the past.

This new knowledge has led to the development and realization of our herein disclosed very successful double cage, full phasing, spring ribbon energized sprag clutch, which has now met the exacting requirements of many field installations where failures with previous one-way clutches of all types have had serious consequences and where all other attempts to satisfy such exacting requirements had been unsuccessful.

In order that some of the terminology involved in presenting technical aspects of the problems we have encountered and solved may be more readily understood, the following definitions are given:

*Energizing force.*—The energizing force as used herein is that force which urges the sprags in a one-way clutch angularly in the direction of or into the position of initial energizing contact with both races so that they will thereafter wedgingly engage in response to the driving race attempting to overrun the driven race.

*Bearing.*—By bearing as used herein, we mean to include any means formed on or carried by either a sprag or adjacent guide such as a peripherally facing wall of a window of a phasing ring, which means is adapted to function in cooperation with an opposed complementary guide or bearing to guide the sprag with reference thereto. This comprehends for example a structure employing line contact and point contact as well as surface to surface guiding and aligning contact.

*Full phasing.*—A full phasing clutch as herein used is one in which all the sprags are identical in size and contour within manufacturing tolerances and wherein the sprags are compelled by positive means, in collaboration with the initiating energizing spring force, to engage the races simultaneously and to maintain their relative engaged positions accurately throughout the working range of the clutch, thereby controlling each sprag element so it carries its proper share of the load and is forced to equally absorb and share any and all abuses imposed on the clutch throughout the entire working range of the clutch. It has been found, for example, that a very satisfactory group of sprags for a particular clutch results where the sprags are held to within .0002" on their initial contact dimension and to within .0006" on their mean and maximum load contact dimensions.

The preferred form of positive phasing means forming the subject matter of this application includes two substantially concentric radially spaced phasing cages, formed with peripherally positioned windows receiving the outer portions of the respective sprags. This arrangement is particularly characterized by the fact that the sprag phasing bearing and aligning portions within the windows and the corresponding complementary phasing bearing and aligning portions of the windows themselves are so relatively contoured as to fill the space therebetween peripherally within close tolerances throughout the normal angular range of movement of the sprags. This has the tremendous advantage of compelling or forcing all of the sprags to move with identical angularity or completely accurate phasing as a result of the forced interaction between all of the sprags and the interposed cooperating phasing cage rings. No one sprag can change angularity unless all sprags simultaneously duplicate the same angular movement. This is of especial significance for fast loading and shock loading and when made further particularly critical by reduced temperatures.

*Dephasing.*—Dephasing as used herein is that undesirable phenomenon wherein individual sprags change their angularity without all of the sprags duplicating the same angular movement. An example occurs when individual sprags back off or out from under their load in a haphazard fashion, thus transferring their load to the adjacent sprag elements that remain engaged, with correspondingly increased loading on the latter which is often disastrous. A sprag transmits torque through the medium of frictional force resulting from being wedged between the races. Since it does not drive by positive means, it is possible under certain conditions in prior art constructions for one or more sprags to slip back to, or almost to, the release position thereof and thus discontinue carrying its or their proportionate share of the total load. If this slipping occurs in successive increments, the sprag is said to walk out from underneath its load and the phenomena is herein sometimes referred to as walking out. This is prevented from happening by means of the herein disclosed invention, even under such severe conditions as torsional vibration and shock loading.

The phenomena of dephasing under load in previously available clutches and the elimination of this phenomena in clutches constructed in accordance with the present invention, has since been demonstrated in the laboratory by the use of high speed motion pictures taken at three thousand frames per second with the clutches subjected to severe torsional oscillating loads.

*Sprag or gripper.*—A sprag or gripper, broadly as used herein, is a mechanical wedge used between two concentric radially opposed cylindrical surfaces or races. When viewed axially, this sprag is defined at least in part by having two incomplete cylindrical raceway engaging surfaces. These engaging arcuate surfaces may be connected by side walls having many configurations or contours.

These raceway engaging surfaces must be of such contour and so located with respect to each other that the dimension across these two surfaces when measured between two flat, parallel plates, will increase when the sprag is moved angularly in one direction and will decrease when the sprag is moved angularly in the opposite direction. The rate of this increase in dimension is limited by further requirements deriving from the fact that the sprag must be capable of wedgingly engaging the races throughout its torque range.

*Coffin corner.*—As used herein this term defines the extreme most edge of either raceway engaging surface of a sprag, corresponding to the maximum angular movement of the sprag in the engaging or wedging position, beyond which the sprag would flip over and there would be no return and hence failure of the clutch. When a sprag is transmitting torque each additional increment of torque causes the sprag to rotate an angular increment and the line of contact between race and engaging surface moves a small distance toward the high load edge of the engaging surface of the sprag. It is this maximum edge which we call the coffin corner.

*Full operating range.*—By full operating range as used herein, we mean to include the tilting of the sprags from the maximum lift off position, sometimes obtained with the outer race overrunning at relatively high speeds, where the sprags may be as much as several thousandths of an inch off the inner race, back to the position of initial frictional engagement with the races, which is usually the normal free wheeling condition, and from this initial engaging position all the way through the varying degrees of loading to and including full load position referred to herein as the "coffin corner" position. In other words, the full operating range is composed of the following zones of operation proceeding from the fully released position of the sprags where they are entirely off of one or the other of the races: including a first zone extending from this completely released position just to but not including the point of or region of initial frictional engagement with the races; a second zone comprising the position or region of initial frictional contact between the races and the sprag; a third zone extending from the second zone to and including the position of maximum tilting in the wedging or torque transmitting direction during which there are varying degrees of loading or torque transmitting effect and during which the sprags are being driven by the relative arcuate movement of the races and forced to turn about their general centers.

Early in our work, the steel wrinkled ribbon energizing spring, as exemplified in Troendly and Ferris copending application, Ser. No. 263,064, filed December 24, 1951, was developed and has since proven to be the most effective means in the present full phasing combination for energizing the sprags into initial frictional engagement with the races. In addition to having embodied in its design an individual spring cantilever tab for energizing each individual sprag, it also has built into it a characteristic whereby the spring tab force is applied against the side of the sprag and in so doing, presses the sprag against the opposite side of the window which, in turn, is axially parallel with the axis of the races. This design of energizing spring ribbon gave us an energized clutch which keeps the sprags lined up in perfect axial parallelism so that when sprags engage, they do so correctly and do not manifest the skewing action which is so often prevalent in sprags energized by other forms of energizing means lacking these features of construction.

While research was continuing on the type of construction as embodied in the above copending case, we became engaged in building one-way clutches for operation under severe conditions of high frequency torque oscillations. Unsuccessful attempts had been made to use a full complement type sprag clutch energized by garter springs and in which hardened end plates were fitted closely to the sprags in an attempt to keep them from skewing.

These full complement sprag clutches failed repeatedly in the laboratory dynamometer work regardless of anything that could be done, including selective precision fits.

This was followed by a research program using the type clutch embodied in the above copending case but which did not have the additional benefit of the herein disclosed full phasing rings. Extensive laboratory dynamometer tests of this type of clutch were conducted with some tests extending over 500 hours of operation. These laboratory tests were completely successful in contrast to the completely unsatisfactory similar laboratory tests with the previous full complement unphased sprag clutches. Following these tests, a number of units were put in the field under operating conditions and a number of failures resulted under severe conditions. The failures ranged from three hours to several hundred hours operating time, with some clutches still in perfect condition after 1000 hours. In addition, the nature and pattern of the failures was irregular.

Therefore, while very successful for many installations, relatively free from severe shock loading and torsional vibrations, it became apparent that some important factors in one-way clutch characteristics and design were yet to be discovered if a successful tough application type of clutch were to be developed.

A study of oscillograph records of the loading imposed upon these clutches revealed both shock and rapid torsional oscillations of high value. Load oscillations from 30% to 100% of full load or torque at the rate of 40 times per second were being encountered.

Diagnosis of laboratory work and study of field failures led to the present discovery that the sprags were dephasing themselves under shock or vibration. We reasoned that some of the sprags were walking out from under their load, throwing additional load onto the remaining sprags and thereby resulting in eventual failure. The cause of this dephasing was believed to be torsional vibration and we determined that positive means for correlating and forcing the phasing of the sprags was the answer.

The present invention has now been successfully employed in such tough applications as driving aircraft compressors and in the front wheel drive of heavy duty trucks, wherein clutches of the unphased type had failed. This invention has likewise solved a severe helicopter drive problem where unphased clutches resulted in very disastrous and spotty unpredictable failures.

We have now established that in some installations a clutch structure built in accordance with the present invention can handle a given torque with no more than one-half the number of sprags required in previous constructions, since the sprags are now compelled or forced to move in accurate phased relation and hence each sprag is forced to share its proportion of the load under all operating conditions, including sub-zero temperatures, vibration, and shock loading. The resulting savings in space, weight, and cost are of importance.

In previously known one-way clutch structures utilizing a pair of concentric cages having openings for receiving the sprags, the inherent defect of all of such designs arises from the fact that there is no means for assuring this requisite positive phasing of the sprags while they are tilted throughout their operating tilt range. In such prior constructions, since both the sprags and the cage openings are straight sided, the openings must be sufficiently large to permit the sprags to tilt to their limit positions without binding, and, as a result, the play previously found to be necessary between the sprags and the sides of the openings in their normal operating range permits each sprag to move angularly relative to all others and out of phase with its neighbors. In the present invention, wherein the sprags are forced to operate in unison or in identical angular relation, all sprags carry their share of the load. Hence, it becomes practical to utilize less sprags for given torque loads than in unphased installations where certain of the sprags fail to carry their share of the load as in the conventional one-way clutches.

It is important to have an appreciation of the "stretch" and distortion phenomena that occur under varying degrees of loading and which are more pronounced as the loads become greater. In the case of sprag clutches which do not incorporate full phasing characteristics and especially wherein all of the sprags are not the same size as herein contemplated, the sprags do not go into and continue in uniform wedging engagement. As wedging progresses, the inner race, which is being compressed and more particularly, the outer race which is being stretched as the load increases, become very much distorted in all sorts of irregular undesirable shapes as distinguished from the original cylindrical shape. The races are distorted unevenly between sprag contacts and are distorted to a greater extent with reference to the more highly loaded sprags which engaged ahead of other late gripping sprags.

In the first place, most all races by the nature of their construction, have associated with them companion bearing fitted parts which are adversely affected by these distortional effects. Every design has the problem of supporting and fixing of the races to other components in the construction of the unit. These supporting and mounting problems are aggravated by irregular race distortion.

As these irregular shapes are forced into the races, due to irregularity of sprag engagement, they tend to destroy the geometrical relationships between the sprag faces and the races which are the controlling factors involved in maintaining proper angles for proper wedging engagement throughout the working range to a point where the necessary angles and resulting necessary wedging action can be lost and individual sprags may even pop out of engagement.

Another factor which is very important in practically all installations is the fatigue life of the races under repeated loading. If the race is compressed or stretched uniformly, stresses are uniform and greater fatigue life results. These chordal distortions and humps and ovalities which irregular sprag engagement induce in the races materially reduces the fatigue life of the races.

It is, therefore, the principal object of the present invention to provide a one-way engaging device, of the foregoing general type, having means for maintaining all of the sprags or grippers in phase with each other under all conditions of operation for thereby securing more uniform engagement and loading of the wedging devices with the concentric races.

More particularly, it is an object of the present invention to provide a one-way engaging device utilizing inner and outer positive phasing cage members, which are adapted to be moved angularly relative to each other and which cage members are effective under all operating conditions, to simultaneously maintain all of the wedging elements at the same tilt angle.

A more detailed object of the present invention is to provide a one-way engaging device for interconnecting a pair of inner and outer coaxial races and comprising a pair of inner and outer positive phasing cage rings each of which has radially extending openings or windows formed therein adapted to receive spaced portions of sprags or grippers, intermediate the ends thereof, and characterized by the cooperating sides of the sprags and of the opposed openings respectively being provided with complementary cooperating phasing and aligning bearing means which provide for the sprags or grippers tilting from a position of complete disengagement from the races to a position of fully loaded engagement with the races, while at the same time there is a minimum of clearance between the cooperating bearing means on the sprags or grippers and bearing means provided in the windows at all tilt positions of the sprags so as to fill the space between the bearing means at all times and which arrangement is effective to compel all of the sprags or grippers to remain in phase with each other.

A still more detailed object of the present invention is to provide one-way clutch structures of the foregoing general type wherein the opposed sides of the sprags and the corresponding circumferentially facing opposed walls of the windows of the phasing cage rings comprise contour defining bearings, and wherein at least certain of the opposed bearing walls of the windows converge to include an obtuse angle and to form a sliding fulcrum for thereby permitting the sprags to tilt into and out of wedging engagement with the races without becoming wedged in said windows, said cooperating surfaces being so disposed as to provide a substantially continuous contact between the cooperating surfaces to thus continuously circumferentially fill said windows irrespective of the degree of tilt of the sprags.

By constructing the cage rings and sprags in accordance with the teachings herein, we have found that the sprags are all forced to accurately phase with each other under severe operating conditions regardless of the degree of tilt thereof.

In the preferred embodiment of the present invention, the sides of the openings in the phasing cage rings comprise bearing surfaces disposed parallel with a radial plane through the axis of the races and the sprags or grippers are formed with peripherally facing phasing and aligning bearing surfaces cooperating with the parallel bearing surfaces comprising the sides of the cage ring openings for thereby permitting tilting of the sprags through their full operating range.

In an alternative embodiment of the present invention, the sprags have flat peripherally spaced side bearing surfaces which cooperate with angularly disposed surfaces formed on the peripherally spaced sides of the openings in the cage rings, to permit the sprags to tilt into and out of wedging engagement with the races.

The foregoing and other objects and advantages of the present invention will become apparent from the following detailed description thereof, when read in conjunction with the accompanying drawings wherein:

Fig. 1 is a fragmentary view of a preferred embodiment of a one-way clutch embodying the principles of the present invention;

Fig. 2 is an enlarged sectional view taken substantially along the line 2—2 of Fig. 1;

Figs. 3, 4 and 5 are fragmentary views of the embodiment of the one-way clutch disclosed in Fig. 1 and show the sprag positioning cages in their relative positions corresponding to different positions of tilt of the sprags;

Fig. 6 is a fragmentary view disclosing a second embodiment incorporating the principles of the present invention;

Fig. 7 is a sectional view of the invention disclosed in Fig. 6 and taken substantially along the line 7—7 in Fig. 6;

Figs. 8, 9 and 10 are fragmentary views of the embodiment of the invention disclosed in Fig. 6 and show the sprag supporting cages in the relative positions corresponding to different tilt positions of the sprags;

Fig. 11 is a sectional view of a one-way clutch comprising two spaced annular rows of sprags, each row being peripherally spaced by a pair of positioning cages;

Fig. 12 is a fragmentary plan view of the outer cage disclosed in Fig. 11;

Figs. 13 through 15 are further fragmentary views of an alternative embodiment showing the sprags and positioning cages in their relative positions corresponding respectively to released free wheeling, half load and full load positions;

Figs. 19, 20 and 21 are fragmentary views of another embodiment showing the sprags and phasing rings in the relative positions occupied thereby in the released free wheeling, half load and full load positions;

Figure 18:
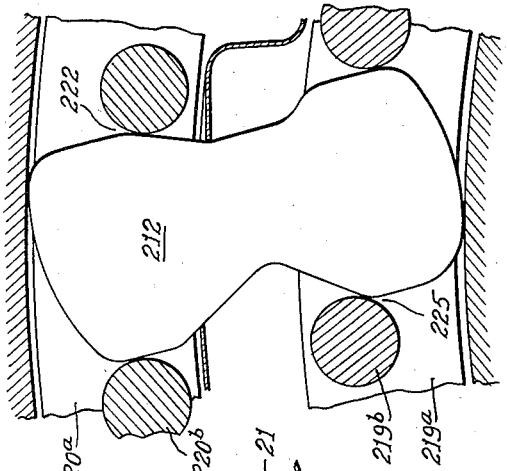
Figs. 16, 17 and 18 are fragmentary views of a still further alternative embodiment showing the sprags and phasing rings in the relative positions occupied thereby respectively in released free wheeling, half load, and full load positions.

Figs. 22 and 23 are views taken respectively on the lines 22—22 and 23—23 of Fig. 20; and Figs. 24 through 31 show in a succession of views one method or technique of arriving at an acceptable full phasing form and contour of sprags and windows as comprehended by this invention.

Prior to the present invention there was no appreciation of the importance of providing a pair of concentric radially spaced arcuately relatively movable phasing rings having windows for receiving spaced portions of the sprags and particularly characterized by the provision of phasing bearing and aligning surfaces on both the sprags and the peripherally facing opposed windows, and so forming the window phasing and aligning surfaces and the sprag aligning and phasing surfaces as to maintain bearing contact between said surfaces on opposite sides of the sprags at all times throughout the arcuate tilting range of the sprags, while at the same time further forming or relieving the sprags and the windows with reference to each other so as to avoid any binding action between the sprags and the windows in the areas flanking the phasing bearing surfaces. In previously available arrangements there has been peripheral play between the windows and the sprags during certain critical angular positions of the sprags and hence the windows have not functioned to accurately force the arcuate phasing of the sprags in unison. The previously available form of sprags have not been relieved or recessed in the body thereof to prevent binding action between the sprags and the windows on at least one flank of the phasing bearing surface, while at the same time maintaining phasing bearing contact with the windows at both peripherally facing sides thereof.

Referring now to the drawings, wherein like reference numerals in the different views identify identical parts, and with particular reference to the first preferred embodiment of the invention disclosed in Figs. 1–5, the one-way clutch disclosed in said figures comprises a pair of substantially concentric inner and outer races 10, 11. A plurality of sprags or grippers 12 are disposed in peripherally spaced relation between the concentric races 10 and 11 and each of the sprags or grippers 12 has a pair of eccentric wedging surfaces 13 and 14 for respectively wedgingly engaging the inner and outer races 10 and 11. The wedging surfaces 13 and 14 are each cylindrical, being respectively generated by constant radii 15 and 16 respectively rotated about points 17 and 18, located centrally of the sprags but displaced from one another. In the embodiments disclosed these generating centers 17, 18 are displaced to locate the center of gravity so that the sprag is made to respond to centrifugal force and thus effect centrifugal disengagement. However, the present invention is equally applicable where these points are displaced or positioned to provide centrifugal engagement or to provide a sprag that does not respond to centrifugal force.

It will be apparent from Fig. 4 that when the sprags 12 are tilted in a clockwise direction about their central portions due to the movement of the races in the free wheeling direction from their Fig. 4 position, under approximately half torque, to their Fig. 3 position they will first become disengaged from driving relation with the races 10 and 11 and then upon the speed of rotation of the outer race reaching a predetermined value they will move out of contact with the inner race under the influence of centrifugal force. Upon tilting of the sprags 12 in a counter-clockwise direction from their Fig. 4 position to their Fig. 5 position, the sprags further wedgingly engage between the two concentric races 10 and 11 for connecting these two races together in torque transmitting relation and in the Fig. 5 position they are transmitting their maximum torque.

A pair of inner and outer spacing and phasing cages, designated respectively by reference numerals 19 and 20 are provided for peripherally spacing the sprags 15 and a flexible spring ribbon energizing cage 21, is disposed concentrically between the phasing cages 19 and 20 for energizing the sprags, that is, biasing them in a counter-clockwise direction about their central portions so as to continuously urge the sprags in the direction of their positions of initial engagement with the races 10 and 11 as shown in Fig. 3.

The outer phasing cage 20 is provided with uniform circumferentially spaced radially extending openings or windows 22, each of which openings is defined by a pair of opposed parallel circumferentially facing bearing surfaces 22a and 23. The surfaces 22a and 23 are each parallel to a plane drawn through the center of rotation of the races and bisecting the space between said surfaces 22a and 23. The inner cage 19 is similarly provided with a plurality of uniformly peripherally spaced sprag positioning openings or windows 25 which are each defined by a pair of circumferentially facing bearing surfaces 24 and 25a. The surfaces 24 and 25a, like the surfaces 22a and 23, are each parallel to a plane drawn through the center of rotation of the races bisecting the space between the surfaces 24 and 25a.

The resilient or flexible spring ribbon energizing cage 21 is of the type disclosed in the above referred copending application and for a more thorough understanding of this spring energizing cage reference should be made to said copending application. It will suffice in the present application to state that the flexible cage 21 is formed with a plurality of peripherally spaced openings defined on one side by a fulcrum or axially aligning edge 26 and on the other side by a flexible energizing tab 27 which extends into said opening. The spring tab 27 functions to constantly and continuously urge the sprag against the fulcrum 26 whereby to assure perfect axial alignment as well as to constantly and continuously exert an individual force on each individual sprag tending to turn or move the sprag about the fulcrum 26 in such a manner as to initiate frictional engagement between the sprag and the races.

Each of the sprags 12, in addition to being provided with the wedging surfaces 13 and 14, is provided with flat parallel axially spaced oppositely facing terminal surfaces 28 and 29. The two sides of the sprags 12 are generally concave or recessed in the central regions of the body of the sprag, the one side 30 being defined in part by a pair of flat outer surfaces 31 and 32 lying in the same plane, and a pair of angularly disposed inwardly converging surfaces 33 and 34. The edge 26 of the openings in the resilient cage 21 is adapted to be seated in a groove defined by the intersection of the surfaces 33 and 34 and this groove provides a fulcrum for relative angular movement between the sprag and spring cage.

The other side 35 of each of the sprags comprises a central portion 36 which may be substantially parallel to the surfaces 31 and 32 on the side 30 of the sprags. Surface 37 extends outwardly from surface 36 in the central portion of the sprag, and merges at its outer terminal with rounded surface 37a, in turn merging with a raceway engaging surface 13. Surface 38 extends outwardly from surface 36 in the central portion of the sprag and merges with an angularly disposed surface 39. Surface 39 and surface 38 subtend an obtuse angle $a$. Surface 39 is disposed at an acute angle $a'$ with reference to surface 36.

We have found for example, that a very satisfactory structure results where this angle is of the order of 12°–17°. The flat surfaces 31, 32 serve the important function of reference surfaces for manufacturing and gauging purposes. The preserving of these reference surfaces, and the need for preserving maximum length of wedging surface 14 results in surfaces 38 and 39 being inclined to one another, as well as in surface 39 being inclined to the reference faces 31 and 32. It will also be noted that the various surfaces including the plane surfaces are made to merge in rounded surfaces to avoid knife edge bearing contact. It will be noted that the tab 27 is seated in the concave portion defined by the surfaces 36 and 38.

Each of the phasing cages 19 and 20 is adapted to have a very free running fit with its associated race. In our production clutches exemplified in this embodiment, the cages are provided with annular radially extending reinforcing centralizing flanges 40 and 41. It is important in clutch installations where back lash or lost motion or delay in engagement is objectionable to eliminate frictional drag between the cages and the races, otherwise in the free wheel condition the sprags will be lifted from contact with one of the races and thus result in an objectionable time lag and shock loading upon reengagement. Production constructions have been found very satisfactory when provided with a diametrical clearance between the cages and the associated races of the order of .005"–.025". This affords the requisite free running relationship assisting in avoiding frictional drag. While it appears that these flanges perform a centering function, it will be appreciated that the perfection of bearing fit between the sprag phasing bearings and the associated window bearings performs a major portion of this centering function of maintaining the requisite relationship between said bearings. In installations where these flanges are employed they do afford an additional guarantee that the bearings and the cages will be maintained in the requisite radial relationship as well as adding the requisite rigidity and durability to the cage.

In the operation of the one-way clutch disclosed in Figs. 1–5, when the races 10 and 11 have the relative directions of rotation shown by arrows in Fig. 3, the sprags 12 will be in the position shown in Fig. 3 with the surface 37 in substantial engagement with the surface 24 of the phasing cage 19 and the terminal portion of the surface 39 in engagement with the surface 23 of the outer phasing cage 20. A bearing clearance between the sprags and the cooperating sides of the window openings in each of the rigid phasing cages of the order of .002"–.010", preferably about .005", has been found to give very satisfactory results. It will be noted that in Fig. 3 the sprags are tilted in a clockwise direction into their lightly engaged or free wheeling positions relative to the races, corresponding to low free wheel speed.

Assuming that the relative directions of rotation of the races 10 and 11 change somewhat so that the outer race will attempt to rotate faster than the inner race in a counter-clockwise direction, then, in this event, the sprags will be tilted in a counter-clockwise direction about their centers toward their engaged position shown in Fig. 5. In moving to the fully engaged position of the sprags, as shown in Fig. 5, each of the sprags will tilt in a counter-clockwise direction and the inner cage 19 will move in a clockwise direction relative to the outer cage 10. Due to the special configuration of the sides 30 and 35 of the sprags, the tilting of the sprags upon relative rotation of the rigid cages 19 and 20 is permitted because of the fact that the effective peripheral dimensions or contour of the sprags disposed within the openings in the rigid cages remains substantially constant irrespective of the angle of tilt of the sprags. As a result, there is a continuous phasing bearing relation of the sprags with the opening defining surfaces in the rigid cages, filling these openings regardless of the degree of tilt of the sprags.

It is important to note that the angularly disposed surfaces 31 and 37 which respectively cooperate with the surfaces 25a and 24 of the inner cage, permit this tilting of the sprags from their position of free wheeling contact shown in Fig. 3, to the position of full wedging engagement shown in Fig. 5, while the angularly disposed surfaces 32, 33, 38 and 39 on the outer portions of the sprags permit the tilting of the sprags within the openings in the outer cage 20.

In view of the fact that there is only a bearing clearance between the sides of the sprags and the adjacent sides of the openings regardless of the position of tilt of the sprags within their normal operating range, all of the sprags will be compelled to operate in unison angularly with each other so that they each occupy the same position of engagement with the races under all conditions of operation. In other words, all of the sprags are forced to stay in phase with each other, that is, at any instant all the sprags are forced to occupy the same relative position of tilt.

We have found that a very satisfactory sprag contour results when a first phasing protuberance or fulcrum is formed in part by rounded apex 38a having the pair of surfaces 38 and 39 extending oppositely therefrom to subtend an included obtuse angle $a$ of the order of 130° to 150°, a second phasing bearing protuberance or fulcrum formed by the rounded protuberance 37a merging with and flanked by a surface 37 which in turn if extended would intersect with the median plane $m$ of the sprag which plane is parallel with the axis of the races, and merging on the other side with the inner raceway engaging surface 13; a third phasing bearing protuberance 31a in opposed relation to said second named phasing bearing 37a, in turn defined at least in part by a pair of oppositely extending surfaces 31, and 34 subtending an obtuse angle $b$ of the order of 160°–170°, at least one of said surfaces if extended intersecting the median plane $m$ of said sprags, and a fourth phasing bearing protuberance or fulcrum 32a defined by a pair of oppositely extending surfaces 32, and 33 subtending an obtuse angle $c$ of the order of 155°–165°, surface 33 if extended intersecting the median plane $m$ of said sprag.

The above dimensions have been found to result in a very satisfactory sprag construction for a sprag adapted to operate between raceways having a radial spacing of the order of .250" to .375". Other radial spacing between raceways may require some variations in these dimensions but which still results in a sprag that comes within the broad teaching of the present invention.

Referring now to the embodiment of the invention disclosed in Figs. 6–10, the one-way clutch disclosed in said figures comprises the usual inner and outer concentric races 10 and 11 and flexible steel ribbon energizing cage 21 having sprag receiving openings defined by fulcrum edges 26 and spring tabs 27. The sprags in this embodiment of the invention are different from those in the first embodiment of the invention and accordingly have been designated herein by reference numeral 50. This form of one-way clutch also includes a pair of inner and outer sprag phasing cages 51 and 52.

The sprags 50 are formed with wedging surfaces 13 and 14 for respectively engaging the races 10 and 11 upon tilting of the sprags. These wedging surfaces comprise cylindrical surfaces generated by radii 15 and 16 rotated about centrally located points 17 and 18. The sprags 50 have flat parallel axially spaced end surfaces 28 and 29 and are formed with peripherally spaced flat sided surfaces 53 and 54. The side surfaces 53 and 54 are respectively provided with central concave grooves 55 and 56, the grooves 55 being adapted to receive the edge 26 of the flexible energizing cage 21 for providing a point about which the sprags may pivot with respect to the cage 21 and the groove 56 being adapted to receive the tab 27 of the energizing cage 21.

The sprag positioning openings formed in the inner cage 51 are defined by a pair of phasing bearing surfaces 57, 57a, 58 and 58a, which permit the sprags 50 to tilt from their positions of complete disengagement, shown in Fig. 8, to their positions of complete engagement, shown in Fig. 10. The sprag positioning openings formed in the outer cage 52 are defined by flat substantially parallel surfaces 59 and 60, which are respectively intersected by angularly disposed surfaces 61 and 62. The angularly disposed surfaces 61 and 62 which define the peripherally spaced sides of the openings in the outer cage 52 permit tilting of the sprags 50 from their positions of full disengagement, shown in Fig. 8, to their positions of full engagement, shown in Fig. 10.

It is contemplated that in this embodiment of the invention, the inner and outer cages 51 and 52 will also have a free running fit on the inner and outer races 10 and 11. To this end, the inner and outer peripheries of the inner and outer cages are respectively formed with a cylindrical shape adapted to have a diametrical free running clearance of the order of .005" to .025" with the respective races.

In the operation of the one-way clutch disclosed in Figs. 6–10, the effective peripheral dimensions of each of the sprags varies as the sprags tilt from their disengaged positions to their engaged positions, however, the angularly arranged surfaces 59, 60, 61 and 62 on the outer cage and 57, 57a, 58 and 58a on the inner cage cooperate in phasing bearing relation with the sides 53 and 54 of the sprags so as to permit the tilting of the sprags with no play between the sprags and the sides of the openings regardless of the position of tilt of the sprags. Accordingly, this embodiment of the invention also provides a one-way clutch wherein all of the sprags are forced to phase with each other irrespective of the position of tilt thereof.

With further reference to Figs. 11 and 12, the one-way clutch disclosed therein can be like either the type disclosed in the first embodiment shown in Figs. 1–5 or of the type shown in the second embodiment disclosed in Figs. 6–10. This form of clutch differs from either of these first two embodiments in that two rows of sprags 12 are adapted to be disposed between the inner and outer races 10 and 11. This form of clutch is also provided with an inner rigid sprag positioning or phasing cage 65 and an outer sprag positioning or phasing cage 66 which are respectively provided with two rows of sprag positioning openings 67 and 68. This one-way clutch also has a flexible energizing cage 69 which may differ from the flexible cage 21 in the other two forms of the invention only in that two annular rows of sprag receiving openings are provided in the flexible cage rather than a single row of sprag receiving openings. The advantage of the one-way clutch of the type shown in Figs. 11 and 12 is that it has substantially twice the torque carrying capacity as a one-way clutch using but a single row of sprags and all of the sprags in both rows are in phase with each other. This form of clutch finds particular utility in those applications where the radial dimension for the clutch is at a premium and where, even so, it is necessary to have a large number of sprags disposed between the races because of the heavy torque loads to be transmitted by the clutch.

Referring to the alternative modification disclosed in Figs. 13 through 15, it will be seen that the sprags 112 may be dumb-bell like in cross-section taken in a plane perpendicular to the axis of the races with the sprags in the upright or half loaded position. This results in spaced enlarged portions or bearing protuberances lying within the windows and results in an intermediate thinner or indented portion between the enlarged portions. The contour of the enlarged portions is made up of all curved surfaces flanked on one terminal thereof by the intermediate reduced or indented section of the sprag and on the other by the respective incomplete cylindrical, eccentrically disposed wedging surfaces 13 and 14. In axial cross-section these sprags, like all of the remaining modifications, are rectangular in outline.

The windows 22, 25 correspond to those in the preferred modification of Figs. 3 to 5 and include parallel oppositely facing aligning and phasing bearing defining walls 22a, 23 in the outer phasing ring 20 and corresponding parallel oppositely facing aligning and phasing bearing defining walls 24, 25a on the inner phasing ring 19. An annular garter type spring 121a is shown passing through openings in the sprags 112 as indicated in dotted lines, and functioning to energize the sprags or urge the same in the direction of contact with the races. The garter spring is employed in this modification to illustrate that while in the more specific aspects of the present invention the ribbon type energizing spring is preferred because of its unique advantages in the present combination, the broad scope of the present invention nevertheless comprehends other forms of energizing means.

Figure 17:
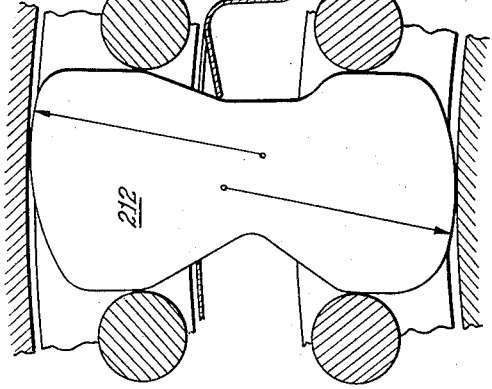
Figure 16:
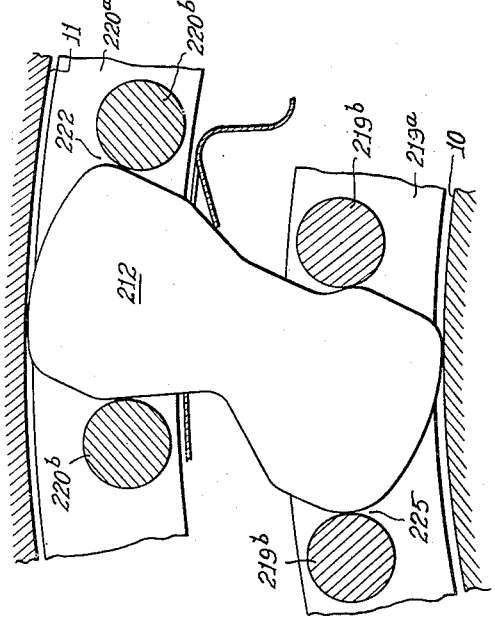

Referring now to the alternative modification disclosed in Figs. 16 through 18, it will be seen that a sprag 212 of the general form employed in the preferred modification of Figs. 3 to 5, with certain necessary variations in contour is utilized. In this modification, the windows 222, 225 of the phasing rings are shown as having rounded peripherally facing contours as distinguished from being made up of flat surfaces as in the preferred form. These windows may be constructed by employing pairs of side rings 219a and 220a joined by cylindrical pins 219b and 220b accurately spaced to define the peripherally facing window aligning and phasing bearing surfaces.

With further specific reference to the particular contour of sprag 212 it will be observed from the positions illustrated in Figs. 16, 17 and 18, that this sprag is made up of a succession of plane surfaces merging in successive angles and joined by rounded portions, the angularity, disposition and dimension of the respective surfaces being dictated by the same factors present in determining the contour of earlier forms, namely, there must be no interference in tilting through the full range and there must always be ample aligning and phasing bearing contact between the sprag bearings and the complementary window bearings.

Turning now to the last proposed embodiment of the present invention disclosed in Figs. 19 through 22, it will be seen that the sprags 12 have the same contour in cross section as those disclosed in Figs. 3 through 5, but that the windows 322 and 325 and the bearing surfaces 322a, 323, 324 and 325a carried therein are differently constructed. Referring specifically to Figs. 22 and 23, it will be seen that the window bearings are in the form of radially elongated, rounded protuberances affording either line or point contact with the bearing sides of the sprags as distinguished from line or surface contact in the other modifications. Specifically, the inner window 325 is provided with one protuberant bearing 324 facing a pair of axially spaced protuberant bearings 325a extending from the other side of the window which in effect assures at all times at least three points of contact with the sprag and functions both to align the sprag and to positively accurately phase the sprag at the inner enlarged portion thereof. In Fig. 23 is shown the relationship of the window bearings in the outer phasing ring 320 with the outer enlarged portion of the sprags and it will be noted that the single protuberant bearing 322a in the outer window 322 corresponds to the pair of bearings 325a on the inner window 325, and the single protuberant bearing 324 on the inner window 325 corresponds to the pair of protuberant bearings 323 on the outer window 322. Thus, in effect, these three point bearings are reversed as between the inner and outer windows in order to assure the essential aligning and bearing relationship at all times. This modification demonstrates the broad scope of the present invention and clearly shows that there are many available forms of bearing contours that may be employed in the windows or on the sprags and still come within the broad concept of positive phasing of the sprags throughout their full range of normal operation.

Each of the alternative modifications of sprags, sprag cross-sections and window cross-sections herein disclosed as well as still others coming within the broad scope of the present invention can be provided and checked for full phasing by means of the technique or method hereinafter described.

Figure 24:
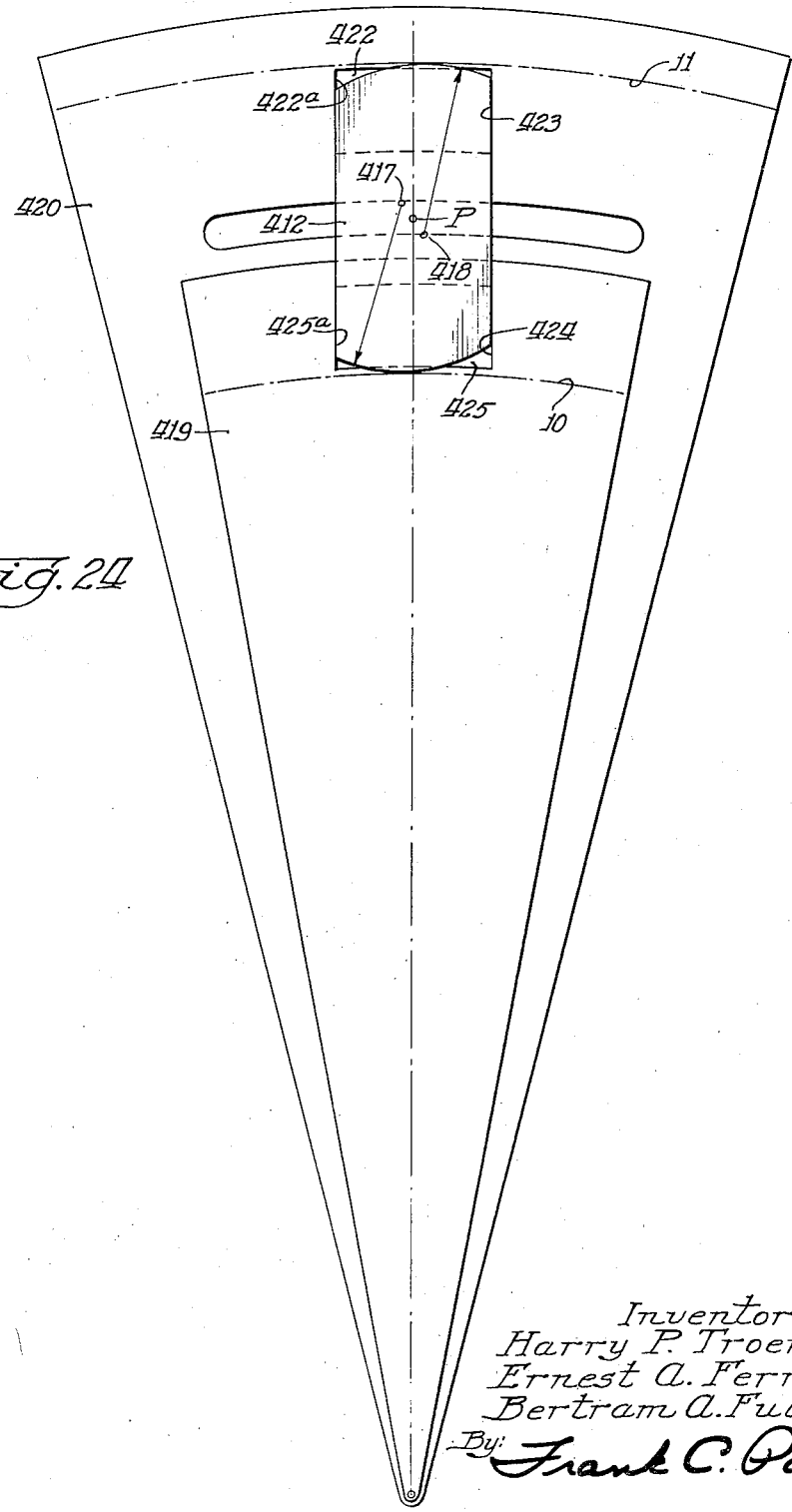
Figure 25:
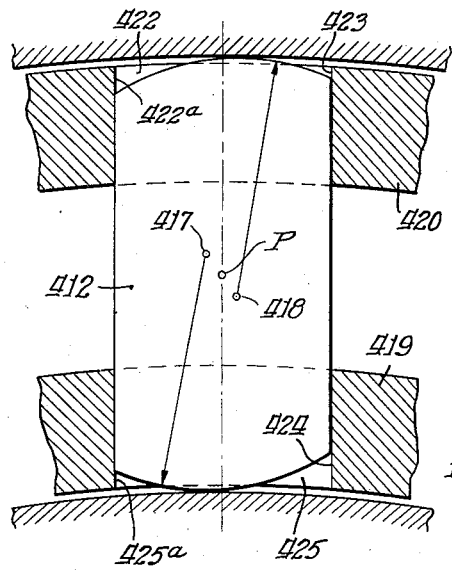

While there are a number of methods or techniques by which acceptable forms or contours of sprags and complementary forms or contours of windows can be arrived at, we have found that one very effective technique is to employ layout templates, duplicating the parts on an enlarged scale, accurately simulating the relative movements thereof in actual operation as presented in Figs. 24 through 31. This may include forming at least one window 422 in the outer template phasing ring 420 and forming window 425 in the inner template phasing ring 419. We may also start with the use of windows having parallel sides 422a, 423, 424, 425a, each in turn parallel with a plane thru the axis of rotation of the races and bisecting the space between these pairs of sides when the windows lie in superimposed relation on a common radius, as shown in Figs. 24 and 25. We may start with a flat or parallel sided template sprag 412 fitting or matching the windows when the latter are located in juxtaposed radially aligned position. Next a pin P is inserted through the general center of the sprag and into the underlying base in order to furnish a pivot for arcuately adjusting the sprag in a manner which has been found to sufficiently closely simulate the action of the sprag in actual operation. In the present example, this center lies midway on the line joining the centers 417, 418 of generation of the two wedging surfaces.

The sprag template 412 is then turned in a clockwise direction to what has been determined from the geometry of the sprag and the races to be the limit of arcuate movement in the released direction, which in the case of the sprag under development, is between 25°–30°.

Figure 26:
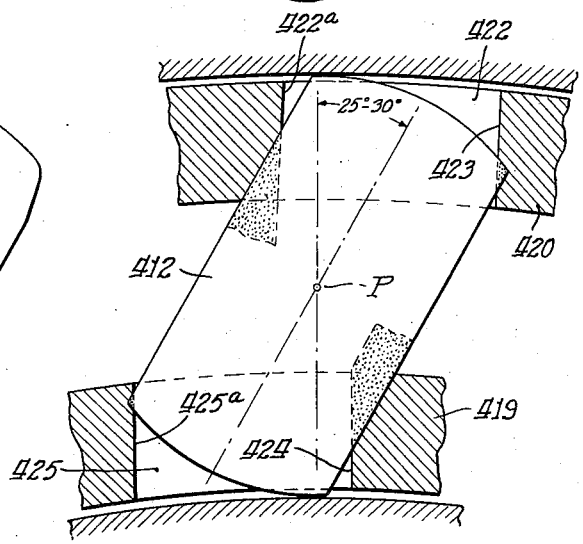

The template phasing rings 419, 420 are next moved arcuately relative to each other in opposite directions to a chosen position, which thereafter will correspond to the above limit of position of the sprag, this position of the parts being shown in Fig. 26. By observing the overlap between the sprag outline and the window outline in the phasing ring templates, the amount and location of the material requiring removal can be readily identified and marked on the template sprag, since in this particular instance all of the material is to be removed from the sprag and none from the windows.

The material requiring removal has been indicated by dotted lines and speckling.

Figure 27:
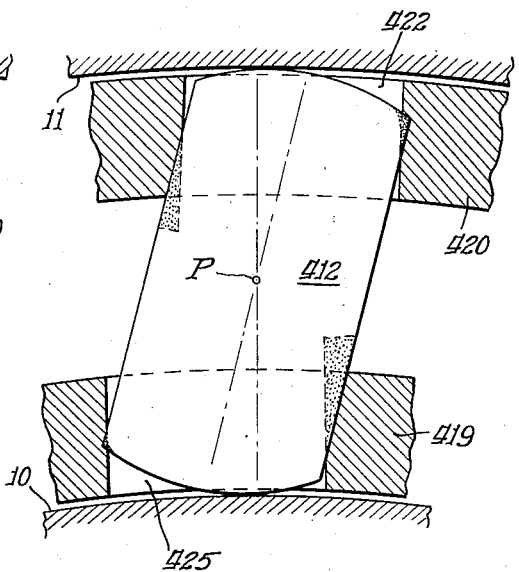
Figure 28:
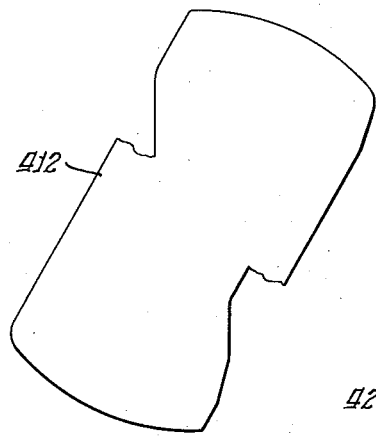

Having thus determined upon the material to be removed to allow this extreme position to be reached without interference, intermediate positions are similarly checked and marked on the sprag template, particular care being taken to make the necessary provision for always leaving bearing means between the sprag and the window bearing walls while at the same time marking for removal the permissible flanking material on the opposite sides of the sprag bearing necessary to prevent binding. One intermediate position where such checking and marking for proper working relationship is accomplished, is shown in Fig. 27. In Fig. 28 there is shown in solid lines the resulting contour of the sprag which will phase and not bind in this first direction of tilt.

Having arrived at the acceptable contour for the sprag for the first extreme angular position, namely, in the released position, and for the intermediate angular positions between this extreme and the partially loaded or straight position, the above steps are repeated for the other angular positions of the sprag between partially loaded position and the fully engaged position thereof shown in Fig. 29. The sprag is first turned to the fully engaged position shown in Fig. 29 which is likewise determined by the geometry of the sprag. In the case of the sprag here being developed, this angle of tilt is about 15°. Again the overlap between the sprag outline and the window outline is observed, and the amount and location of the material requiring removal is identified and marked in the same manner. Fig. 30 illustrates the checking and marking of the sprag for intermediate positions on the engaging side between half and full load. Fig. 31 shows in full lines the resulting sprag. In dotted lines there is indicated the further removal of side material, including that to be removed for manufacturing reasons as well as to provide the requisite converging surfaces forming a fulcrum or locating surface for engagement by the ribbon energizing spring.

It will of course be appreciated that this resulting sprag template will again be carefully checked by the same process to further assure that the material as finally removed results in a sprag and window relationship that will fully phase the sprags without binding.

It will thus be apparent that the material may be removed from either the sprag or the opposed wall of the window or some from both. It will also be appreciated that while we prefer that flat reference surfaces on one side of the sprag be left since this has important advantages in certain preferred embodiments of the invention, particularly for manufacturing and gaging purposes, the thing of critical importance insofar as the broader aspects of this invention are concerned is the necessary removal of material whether the resulting recessed contour in the general center of the body of the sprag is curved or plane or a combination of both. In other words, although in certain specific applications of the present invention, angularly disposed surfaces are disclosed because of their particular advantages the present invention in its broader aspects is not limited to angularly disposed surfaces.

From the foregoing description of the present invention it will be apparent to those skilled in the art that we have provided an improved one-way clutch which, because of the fact that the sprags are all in phase with each other under all conditions of operation, performs particularly satisfactorily when the clutch is subjected to such adverse conditions as extreme torsional vibration and shock loading. It is contemplated that numerous changes and modifications may be made in the present invention without departing from the spirit or scope thereof.

The term "clutch" as used herein is to be construed as a coupling adapted to operate between two relatively movable members, one of which may be fixed in which case the coupling could operate as a brake.

What is claimed is:

1. A one-way clutch adapted to operate between inner and outer coaxial races comprising a plurality of grippers adapted to be mounted between the races and tiltable into and out of wedging engagement with said races, relatively rotatable inner and outer cage rings adapted to be disposed between the races and each having peripherally spaced radially extending openings, said grippers being positioned between the races and having their end portions extending through said openings, said openings in said cage rings and the opposed peripherally facing sides of the related gripper being formed with sets of cooperating bearing surfaces, each of said sets of bearing surfaces including non-planar portions and being in continuous bearing contact between said cooperating surfaces during tilting movements of said grippers into and out of wedging engagement with said races and relative rotation of said cage rings.

2. A one-way clutch adapted to operate between inner and outer coaxial races comprising a plurality of grippers adapted to be mounted between the races and tiltable into and out of wedging engagement with said races, relatively rotatable inner and outer cage rings adapted to be disposed between the races and each having peripherally spaced radially extending openings through which the ends of the grippers extend, said openings in said cage rings and opposed sides of said grippers respectively being formed with sets of cooperating phasing bearing surfaces, and pairs of said surfaces on said grippers being angularly disposed with respect to each other and peripherally spaced with respect to each other so as to provide a continuous bearing contact with said cage bearing surfaces during tilting movements of said grippers into and out of wedging engagement with said races and relative rotation of said cage rings, whereby all of said plurality of tiltable grippers are forced to phase angularly with each other under all relative positions of said cage rings throughout the full operating range of the grippers.

3. A one-way clutch adapted to operate between inner and outer coaxial races comprising a plurality of grippers adapted to be mounted between the races and tiltable into and out of wedging engagement with said races, relatively rotatable inner and outer phasing cage rings adapted to be disposed between the races and each having peripherally spaced radially extending openings through which the ends of the grippers extend, an energizing spring mounted for biasing said grippers into wedging engagement with said races, said openings in said phasing cage rings and opposed sides of said grippers respectively being formed with sets of cooperating surfaces, and pairs of said surfaces being angularly disposed with repect to each other and peripherally spaced with respect to each other so as to provide a sliding contact bearing between said cooperating surfaces with continuous bearing contact therebetween throughout the operating tilt range of the grippers.

4. A one-way clutch adapted to operate between inner and outer concentric races comprising a plurality of grippers adapted to be mounted between the races and tiltable into and out of wedging engagement with said races, relatively rotatable inner and outer phasing cage rings adapted to be disposed between the races and each having peripherally spaced radially extending openings through which the ends of the grippers extend, said inner and outer cage rings each including means providing a free running fit on said races for maintaining each of said cage rings concentrically aligned between said races, said openings in said cage rings and opposed sides of said grippers respectively being formed with sets of cooperating surfaces, and pairs of said surfaces being angularly disposed with respect to each other and peripherally spaced with respect to each other so as to provide a continuous bearing contact between said cooperating surfaces during tilting movements of said grippers into and out of wedging engagement with said races and throughout the operating tilt range of the grippers.

5. A one-way clutch adapted to operate between inner and outer concentric races comprising a plurality of grippers adapted to be mounted between the races and tiltable into and out of wedging engagement with said races, relatively rotatable inner and outer phasing cage rings adapted to be disposed between the races and each having peripherally spaced radially extending openings through which the ends of the grippers extend, said inner cage including means providing a free running fit on one of said races and effective to maintain the inner cage concentrically aligned with said races, and further effective to maintain radial alignment with the phasing surfaces of the sprags, said outer cage ring including means providing a free running fit on one of said races and effective to maintain the outer cage ring concentrically aligned with said races, and further effective to maintain radial alignment with the phasing surfaces of the sprags, said openings in said cage rings and opposed sides of said grippers respectively being formed with sets of cooperating surfaces, and pairs of said surfaces being angularly disposed with respect to each other and peripherally spaced with respect to each other so as to provide a continuous sliding bearing fit between said cooperating surfaces during tilting movements of said grippers into and out of wedging engagement with said races and relative rotation of said cage rings.

6. A one-way clutch adapted to operate between inner and outer concentric races comprising a plurality of grippers adapted to be mounted between the races and tiltable into and out of wedging engagement with said races, relatively rotatable inner and outer phasing cage rings adapted to be disposed between the races and each having peripherally spaced radially extending openings through which the ends of the grippers extend, said inner cage including an inwardly extending peripheral reinforcing flange providing a free running fit on the inner race for assisting in maintaining the inner cage concentrically aligned with said races, and for assisting in maintaining radial alignment with the phasing surfaces of the sprags, while assisting in avoiding friction drag between said inwardly extending peripheral flange and said inner race, said outer cage ring including an outwardly extending peripheral reinforcing flange providing a free running fit within said outer race for assisting in maintaining the outer cage ring concentrically aligned with said races, and for assisting in maintaining radial alignment with the phasing surfaces of the sprags while assisting in avoiding friction drag between said outwardly extending peripheral flange and said outer race, said openings in said cage rings and opposed sides of said grippers respectively being formed with sets of cooperating surfaces, and pairs of said surfaces being angularly disposed with respect to each other and peripherally spaced with respect to each other so as to provide a continuous sliding bearing fit between said cooperating surfaces during tilting movements of said grippers into and out of wedging engagement with said races and relative rotation of said cage rings.

7. A one-way clutch adapted to operate between inner and outer concentric races comprising a plurality of grippers adapted to be mounted between the races and tiltable into and out of wedging engagement with said races, relatively rotatable inner and outer phasing cage rings adapted to be disposed between the races and each having peripherally spaced radially extending openings through which the ends of the grippers extend, said inner cage including an inwardly extending peripheral reinforcing flange providing a free running fit on the inner race, with a diametrical clearance of the order of .005"-.025", for assisting in maintaining the inner cage concentrically aligned with said races, and for assisting in maintaining radial alignment with the phasing surfaces of the sprags, while assisting in avoiding friction drag between said inwardly extending peripheral flange and said inner race, said outer cage ring including an outwardly extending peripheral reinforcing flange providing a free running fit within said outer race, with a diametrical clearance of the order of .005"-.025", for assisting in maintaining the outer cage ring concentrically aligned with said races, and for assisting in maintaining radial alignment with the phasing surfaces of the sprags, while assisting in avoiding friction drag between said outwardly extending peripheral flange and said outer race, said openings in said cage rings and opposed sides of said grippers respectively being formed with sets of cooperating surfaces, and pairs of said surfaces being angularly disposed with respect to each other and peripherally spaced with respect to each other so as to provide a continuous sliding bearing fit between said cooperating surfaces during tilting movements of said grippers into and out of wedging engagement with said races and relative rotation of said cage rings.

8. A one-way clutch adapted to operate between inner and outer coaxial races comprising a plurality of tiltable grippers adapted to be mounted between the races, each of said grippers being tiltable into and out of wedging engagement with said races, relatively rotatable inner and outer phasing cage rings adapted to be disposed between the races and each having means defining uniformly peripherally spaced radially extending openings through which the ends of the grippers extend including peripherally spaced opposed walls forming sides of said openings, opposed peripherally spaced sides of said grippers and said walls respectively defining sets of engaging and cooperating surfaces, and each of said walls including portions disposed angularly with respect to each other so as to provide a continuous sliding bearing fit between said cooperating surfaces during tilting movements of said grippers into and out of wedging engagement with said races and relative rotation of said cage rings.

9. A one-way clutch adapted to operate between inner and outer coaxial races comprising a plurality of grippers adapted to be mounted between the races and tiltable into and out of wedging engagement with said races, relatively rotatable inner and outer phasing cage rings adapted to be disposed between the races and each having peripherally spaced radially extending substantially rectangularly shaped openings through which the ends of the grippers extend, the peripherally facings sides of said openings comprising surfaces extending completely through the cage rings and disposed substantially parallel to each other and parallel to the axis of rotation of the races, and peripherally spaced sides of said grippers comprising spaced surfaces angularly disposed with respect to each other and cooperable with the parallel surfaces of said rectangularly shaped openings so as to provide a continuous sliding bearing fit between the cooperating surfaces on the grippers simultaneously on both sides thereof with the peripherally facing sides of said openings during tilting movements of said grippers into and out of wedging engagement with said races and relative rotation of said cage rings.

10. One-way clutch structure adapted to operate between concentric inner and outer cylindrical races comprising a plurality of wedging devices adapted to be mounted between the races with each of the wedging devices being tiltable into and out of wedging engagement with said races, relatively rotatable inner and outer phasing cage rings adapted to be disposed concentrically between the races, each of the cage rings including means defining a plurality of peripherally spaced radially extending openings through which the ends of the wedging devices extend, each of said openings being defined in part by a pair of peripherally spaced and peripherally spacing sides, each of said facing sides extending through the associated cage and being parallel to each other and parallel to the axis of rotation of said races, and each of said wedging devices having peripherally spaced sides formed with centrally recessed indentations therein and defined by intersecting angularly disposed surfaces, resulting in a reduced central cross-section, the peripherally spaced sides of said wedging devices being adapted to slidingly engage the peripherally spaced facing sides of said openings, and said angularly disposed surfaces permitting tilting of said wedging devices in unison into and out of wedging engagement with the races while providing continuous sliding bearing fit between the wedging devices and with both peripherally spaced sides of the openings throughout the operating tilt range of the wedging devices.

11. One-way clutch structure adapted to operate between concentric inner and outer cylindrical races comprising a plurality of wedging devices adapted to be mounted between the races with each of the wedging devices being tiltable into and out of wedging engagement with said races, relatively rotatable inner and outer phasing cage rings adapted to be disposed concentrically between the races, each of the phasing cage rings including means defining a plurality of peripherally spaced radially extending openings through which the ends of the wedging devices extend, an annular flexible spring steel ribbon energizing cage adapted to be disposed between said inner and outer cage rings and having spaced openings therein for receiving said wedging devices, said ribbon openings each being defined in part by a fulcrum forming edge parallel to the axis of rotation of said races and by an opposed flexible tab portion likewise presenting an inner terminal edge parallel to the axis of rotation of said races, each of said openings in said phasing cage rings being defined in part by a pair of peripherally spaced facing sides, each of said facing sides being parallel to each other, and each of said wedging devices having peripherally spaced sides formed with central indentations therein defined by intersecting angularly disposed surfaces, said fulcrum forming edge of each of said ribbon openings being adapted to be seated in said central indentation on one side of each of said wedging devices, said flexible tabs being adapted to be seated in said central indentations on the other side of each of said wedging devices each of said tabs being adapted to exert an individual tilting force on the corresponding wedging device in the direction of engagement of said races, the peripherally spaced sides of said wedging devices being adapted to slidingly engage the peripherally spaced facing sides which define said openings in said cage rings and said angularly disposed surfaces permitting tilting of said wedging devices while maintaining continuous sliding bearing fit with said facing sides.

12. A one-way clutch adapted to operate between inner and outer coaxial races comprising a plurality of grippers adapted to be mounted between the races and tiltable into and out of wedging engagement with said races, relatively rotatable inner and outer phasing cage means adapted to be disposed between the races and each having means defining peripherally spaced radially extending openings disposed in rows through which the ends of the grippers extend, said openings in said cage rings and opposed sides of said grippers respectively being formed with sets of cooperating surfaces, and pairs of said surfaces being angularly disposed with respect to each other and peripherally spaced with respect to each other so as to provide a continuous bearing contact between said cooperating surfaces during tilting movements of said grippers into and out of wedging engagement with said races upon relative rotation of said cage rings.

13. A one-way clutch adapted to operate between a pair of concentric races comprising a plurality of grippers adapted to be mounted between the races and tiltable through an operating range including a position of initial frictional engagement with the races and a full load position in which said grippers are adapted to wedgingly couple said races, and means positionable between the races maintaining continuous bearing engagement with grippers adjacent thereto throughout substantially the entire portion of the gripper tilting range effective to produce substantially identical angular tilting movement of said grippers throughout at least a major portion of the range of tilting movement of said grippers.

14. A one-way clutch adapted to operate between a pair of concentric races comprising a plurality of grippers adapted to be mounted between the races and tiltable through an operating range including a full load position of wedging engagement with said races and a non-wedging position of initial frictional contact with the races, said clutch including means defining a plurality of pairs of peripherally spaced surfaces, and said means said surfaces cooperate during tilting movements of said being constructed and arranged so that adjacent ones of said surfaces cooperate during tilting movements of said grippers to provide a continuous sliding bearing fit for said grippers on both peripherally facing sides thereof throughout their operating range.

15. A one-way clutch adapted to operate between a pair of concentric races comprising a plurality of grippers adapted to be mounted in peripherally spaced alignment between said races and tiltable through an operating range including a full load position of wedging engagement with said races and a non-wedging position of initial frictional contact with the races, spacing means positionable between the races disposed between adjacent pairs of grippers for maintaining said grippers in peripherally spaced alignment, said spacing means and said grippers including contacting surfaces adapted to remain in engagement throughout substantially the entire gripper tilting range so as to provide a substantially continuous bearing contact therebetween during tilting movements of said grippers throughout the operating range thereof whereby all of said plurality of tiltable grippers remain in phase with each other under all relative tilt positions thereof.

16. A one-way clutch adapted to operate between a pair of concentric races comprising a plurality of grippers adapted to be mounted in peripherally spaced alignment between said races and tiltable through an operating range including a full load position of wedging engagement with said races and a non-wedging position of initial frictional contact with the races, spacing means positionable between the races disposed between each adjacent pair of grippers for maintaining said grippers in peripherally spaced alignment, said spacing means having sides defined by angularly disposed surfaces, and the peripherally spaced sides of said grippers being defined by surfaces respectively adapted to remain in engagement with said sides on said spacing means throughout substantially the entire gripper tilting range and slidingly engage the adjacent surfaces on said spacing means whereby to provide a substantially continuous contact between the slidingly engaged surfaces during tilting of the grippers throughout the operating range thereof whereby all of said plurality of tiltable grippers remain in phase with each other under all relative tilt positions thereof.

17. A one-way clutch adapted to operate between a pair of concentric races comprising a plurality of grippers adapted to be mounted in peripherally spaced alignment between said races and tiltable through an operating range including a full load position of wedging engagement with said races and a non-wedging position of initial frictional contact with the races, spacing means disposed between each adjacent pair of grippers for maintaining said grippers in peripherally spaced alignment and forcing the same to always remain in angular phased relation, said spacing means having peripherally facing sides defined by opposed substantially parallel surfaces extending through said spacing means, and the peripherally spaced sides of said grippers being defined by angularly disposed surfaces respectively adapted to slidingly engage both of the adjacent parallel surfaces on said spacing means simultaneously, said grippers and spacing means being constructed and arranged to provide a continuous bearing contact between the slidingly engaged surfaces thereof during tilting of the grippers throughout the operating range thereof whereby all of said plurality of tiltable grippers are forced to remain in phase with each other under all relative tilt positions thereof.

18. A one-way clutch adapted to operate between inner and outer coaxial races comprising a plurality of sprag type grippers adapted to be carried between said races and tiltable into and out of wedging engagement with said races, relatively arcuately movable inner and outer phasing cage defining means adapted to be disposed in radially spaced relation, each of said cage defining means being formed with a plurality of sprag receiving windows, said windows including means defining accurately spaced radially extending opposed phasing and aligning bearings, each of said sprags being formed with phasing and aligning side bearings, complementary to said window bearings and of such dimensions and contours as to completely fill the space peripherally between corresponding phasing bearings of said windows and provide continuous phasing bearing contact through the full operating tilt range of said grippers.

19. A one-way clutch adapted to operate between inner and outer coaxial races comprising a plurality of sprag type grippers adapted to be carried between said races and tiltable into and out of a loading zone of engagement with said races, relatively arcuately movable inner and outer phasing cage defining means adapted to be disposed between said races in radially spaced relation, each of said cage defining means being formed with a plurality of sprag receiving windows, said windows including means defining accurately spaced radially extending opposed phasing and aligning bearings, each of said sprags being formed with phasing and aligning side bearings, complementary to said window bearings and of such dimensions and contours as to completely fill the space peripherally between corresponding phasing bearings of said windows and provide continuous phasing bearing contact in said loading zone.

20. A one-way clutch adapted to operate between inner and outer coaxial races comprising a plurality of sprag type grippers adapted to be carried between said races and tiltable into and out of a loading zone of engagement with said races, relatively arcuately movable inner and outer phasing cage defining means adapted to be disposed between said races in radially spaced relation, each of said cage defining means being formed with a plurality of sprag receiving windows, said windows including means defining accurately spaced radially extending opposed phasing and aligning bearings, each of said sprags being formed with phasing and aligning side bearings, complementary to said window bearings and of such dimensions and contours as to completely fill the space peripherally between corresponding phasing bearings of said windows and provide continuous phasing bearing throughout at least a major portion of the loading zone.

21. A one-way clutch adapted to operate between inner and outer coaxial races comprising a plurality of sprag type grippers adapted to be carried between said races and tiltable into and out of wedging engagement with said races, relatively arcuately movable inner and outer phasing cage defining means adapted to be disposed between said races in radially spaced relation, each of said cage defining means being formed with a plurality of sprag receiving windows, said windows being defined in part by accurately and identically spaced radially extending opposed parallel peripherally facing phasing bearing and aligning surfaces, each of said sprags being formed with complementary phasing bearing and aligning surfaces of such contour and spacing as to peripherally fill the corresponding windows and provide a continuous bearing contact between said grippers and said phasing bearing and aligning surfaces of said windows throughout the entire range of tilting from a free-wheel position of said grippers into and out of wedging engagement with said races, said complementary contour of said grippers being further particularly characterized by having at least one pair of surfaces converging to include an obtuse angle culminating in a rounded apex or fulcrum bearing on the opposed side wall of said window during at least a portion of the arcuate movement of said gripper, at least one of the surfaces leading away from said apex receding in the direction of the body of the gripper facilitating the sliding bearing movement of said gripper about said fulcrum without binding interference between said gripper and the adjacent window walls.

22. In a one-way clutch adapted to operate between a pair of concentric races, a plurality of sprag type grippers adapted to be positioned between said races and tiltable into and out of wedging engagement with said races, means defining a pair of concentric radially spaced annular gripper phasing rings, each of said rings being formed with a plurality of gripper receiving windows, said windows being accurately and identically spaced circumferentially with the chordal distances between the geometric centers of said windows in the respective phasing rings having the same dimension, said grippers being further particularly characterized by having formed thereon contoured side phasing surfaces lying in bearing contact with the circumferentially spaced walls of said windows for all positions of said grippers throughout the entire range of tilting from a free-wheel position of said grippers to and including the end of a working range or position of maximum torque with said races, to within a clearance of the order of from .002" to .010", preferably about .005", said side contour surfaces being defined at least in part by pairs of surfaces converging in an obtuse angle, said converging surfaces functioning to assure continuous contact between the gripper and the side walls of said window and further functioning to prevent binding between the windows and the sides of said grippers flanking said bearing surfaces.

23. In a one-way clutch adapted to operate between a pair of concentric races, a plurality of sprags having opposed terminal raceway engaging surfaces adapted to be located between said races and tiltable into and out of wedging engagement with said races, means defining a pair of concentric radially spaced annular sprag phasing cages, each of said cages being formed with a plurality of uniformly peripherally spaced windows for receiving spaced portions of said sprags, said windows being characterized by including pairs of opposed peripherally facing aligning and phasing bearings, said sprags being further particularly characterized by having formed thereon contoured complementary side surfaces functioning as phasing bearing and aligning surfaces in cooperation with said window bearings, said relationship being particularly characterized by the peripheral distance between opposed bearings of said sprags always being equal to the spacing between the corresponding opposed window bearings within a bearing clearance of the order of .002" to .010", preferably about .005", said sprag phasing bearing surfaces being flanked by at least one relieving recess in the body of the sprag functioning to provide for tilting thereof throughout its full range with reference to the adjacent window without binding thereagainst.

24. In a one-way sprag clutch adapted to operate between a pair of concentric races, a plurality of sprags having opposed eccentric raceway engaging terminal surfaces adapted to be located between said races and tiltable into and out of wedging engagement with said races, means defining a pair of concentric radially spaced annular sprag phasing cages, each of said cages being formed with a plurality of uniformly peripherally spaced windows for receiving phasing bearing portions of said sprags, said windows being characterized by having pairs of opposed peripherally facing parallel bearing surfaces, said window bearing surfaces also being parallel to the axis of rotation of said races, said sprags being further particularly characterized by being formed in cross-section proceeding clockwise thereabout, with a first phasing bearing protuberance formed by a rounded apex having a pair of surfaces extending therefrom to subtend an included obtuse angle and having directions such that if extended beyond their terminals would intersect the median plane of said sprag, a second rounded phasing protuberant bearing surface or fulcrum defined on one side by a surface which if extended would intersect the median plane of said sprag and on the other side by one of said raceway engaging surfaces, a third phasing bearing protuberance or fulcrum in opposed relation to said second named protuberance and, in turn, defined at least in part by a pair of oppositely extending surfaces subtending an obtuse included angle, at least one of said surfaces extended intersecting the median plane of said sprag, and a fourth phasing bearing protuberance or fulcrum in generally opposed relation to said first named phasing bearing protuberance or fulcrum defined by a pair of oppositely extending surfaces subtending an obtuse angle, one of said last named surfaces extended intersecting the median plane of said sprags.

25. In a one-way clutch including means defining a plurality of sprags adapted to be carried between inner and outer concentric races and adapted to be tilted into and out of wedging engagement with said races, relatively arcuately movable inner and outer phasing cage defining means adapted to be disposed between said races, each of said phasing cage defining means being formed with a plurality of sprag receiving windows, said windows including means defining accurately spaced generally radially extending opposed phasing and aligning bearings, each of said sprags being particularly characterized by having a rectangular cross-section centrally thereof taken in a plane passing through the axis of rotation of the races and having a reduced central portion in cross-section taken in a plane perpendicular to the axis of rotation of the races, resulting in outer and inner enlarged portions, each of said portions being provided with peripherally opposed bearing means, opposite ones of said bearing means being accurately spaced from each other and so contoured and proportioned with reference to the said cooperating window bearings as to compel each of said sprags to accurately duplicate the angularity of all the other sprags in a free wheeling zone, and in a loading zone, at least one of said bearing means being defined in part by a straight line, and at least one of the other of said bearings being defined in part by being rounded in contour.

26. In a one-way clutch including means defining a plurality of sprags adapted to be carried between inner and outer concentric races and tiltable into and out of wedging engagement with said races, relatively arcuately movable inner and outer phasing cage defining means adapted to be disposed between said races, each of said phasing cage defining means being formed with a plurality of sprag receiving windows, said windows including accurately spaced generally radially extending opposed phasing and aligning bearing means, each of said sprags being particularly characterized by having a rectangular cross-section centrally thereof taken in a plane passing through the axis of rotation of the races and having a reduced central section in a cross-section lying in a plane perpendicular to the axis of rotation of the races, resulting in outer and inner enlarged portions, each of said portions being formed to provide peripherally opposed accurately spaced bearing means, opposite ones of said bearing means being accurately spaced from each other and so contoured and proportioned with reference to the said cooperating window bearings as to compel each of said sprags to accurately duplicate the angularity of all the other sprags in a free wheeling zone, in an initial engaging zone and throughout at least a major portion of a loading zone, at least one of said bearing means being defined in part by a straight line, at least one of the other of said bearings being defined in part by being rounded in contour, and another of said bearings being defined at least in part by a pair of converging straight lines.

27. In a one-way clutch including means defining inner and outer coaxial cylindrical races, means defining a plurality of sprags adapted to be carried between said races and tiltable into and out of wedging engagement with said races, relatively arcuately movable inner and outer phasing cage defining means adapted to be disposed between said races, each of said phasing cage defining means being formed with a plurality of sprag receiving windows, said windows including means defining accurately spaced generally radially extending opposed phasing and aligning bearings, each of said sprags being particularly characterized by having a rectangular cross-section centrally thereof taken in a plane parallel to and passing through the axis of rotation of the races and having a reduced central section in a cross-section lying in a plane perpendicular to the axis of rotaiton of the races, resulting in outer and inner enlarged sprag portions, each of said portions being formed to provide peripherally opposed accurately spaced bearings, opposite ones of said bearing means being accurately spaced from each other and so contoured and proportioned with reference to the said cooperating window bearings as to compel each of said sprags to accurately duplicate the angularity of all the other sprags in a free wheeling zone, in an initial engaging zone and in at least a major portion of a loading zone, at least one of said bearings being defined in part by a flat surface, at least one of the other of said bearings being defined in part by being rounded in contour, and another of said bearings being defined at least in part by a pair of converging straight lines.

28. In a one-way clutch including means defining inner and outer coaxial cylindrical races, means defining a plurality of sprags adapted to be carried between said races and tiltable into and out of wedging engagement with said races, relatively arcuately movable inner and outer phasing cage defining means adapted to be disposed between said races, each of said phasing cage defining means being formed with a plurality of sprag receiving windows, said windows including means defining accurately spaced generally radially extending opposed phasing and aligning bearings, each of said sprags being particularly characterized by having a rectangular central cross-section in a plane passing through the axis of rotation of the races and having a generally dumb-bell like contour in cross-section in a plane perpendicular to the axis of rotation of the races resulting in outer enlarged portions defining peripherally oppositely facing phasing bearings of such contour and spacing as to maintain phasing bearing relation with said spaced radially extending opposed and aligning bearings of said windows throughout the full range of tilting of said grippers.

29. A one-way clutch adapted to operate between inner and outer coaxial races comprising a plurality of sprag type grippers adapted to be disposed between said races and tiltable into and out of wedging engagement with said races, relatively arcuately movable inner and outer phasing cage defining means adapted to be disposed between said races in radially spaced relation, each of said cage defining means being formed with a plurality of sprag receiving windows, said windows being defined in part by substantially parallel peripherally facing phasing bearing and aligning surfaces extending completely through said cage means, said sprags including complementary phasing bearing and aligning surfaces of such contour and spacing as to peripherally fill the corresponding windows and provide a continuous bearing contact between said grippers and said phasing bearing and aligning surfaces of said windows throughout the entire range of tilting from a free-wheel position of said grippers to a full load wedging position of said grippers with said races and vice versa.

30. A one-way clutch adapted to operate between a pair of concentric races together providing a pair of radially spaced and generally annular surfaces, comprising a plurality of grippers each including radially spaced eccentrically curved race engaging surfaces and tiltable normally through an operating range including a position of initial frictional engagement with the races and a full load position in which said grippers are adapted to wedgingly couple said races, and means positionable between the annular surfaces of the races maintaining continuous bearing engagement with grippers adjacent thereto throughout substantially the entire portion of the gripper tilting range effective to produce substantially common angular tilting movement of said grippers throughout at least a major portion of said gripper tilting range.

31. A one-way clutch adapted to operate between a pair of concentric races together providing a pair of radially spaced and generally annular surfaces, comprising a plurality of grippers each including radially spaced eccentrically curved race engaging surfaces and tiltable normally through an operating range including a position of initial frictional engagement with the races and a full load position in which said grippers are adapted to wedgingly couple said races, and means above and below the radial midpoint of said grippers positionable between the annular surfaces of the races maintaining continuous bearing engagement with grippers adjacent thereto throughout substantially the entire portion of the gripper tilting range adapted to produce substantially common angular tilting movement of said grippers throughout at least a major portion of said gripper tilting range.

32. A one-way clutch adapted to operate between a pair of concentric races together providing a pair of radially spaced and generally annular surfaces, comprising a plurality of grippers each including radially spaced eccentrically curved race engaging surfaces and tiltable normally through an operating range including a position of initial frictional engagement with the races and a full load position in which said grippers wedgingly couple said races, and rigid means above and below the radial midpoint of said grippers positionable between the annular surfaces of the races maintaining continuous bearing engagement with grippers adjacent thereto throughout substantially the entire portion of the gripper tilting range adapted to force substantially common angular tilting movement of said grippers throughout at least a major portion of said gripper tilting range.

33. A one-way clutch adapted to operate between a pair of concentric races together providing a pair of radially spaced and generally annular surfaces, comprising a plurality of grippers having radially spaced eccentrically curved race engaging surfaces and tiltable normally through an operating range including a position of initial frictional engagement with the races and a full load position in which said grippers wedgingly couple said races, and means effective to produce substantially common angular tilting movement of said grippers throughout at least a major portion of said gripper tilting range comprising a pair of relatively arcuately movable cages, means defining openings therein through which radially spaced portions of said grippers respectively extend, said opening defining means and said grippers including surfaces defining contacting means adapted to remain in engagement throughout substantially the entire gripper tilting range.

34. A one-way clutch adapted to operate between a pair of concentric races together providing a pair of radially spaced and generally annular surfaces, comprising a plurality of grippers having radially spaced eccentrically curved race engaging surfaces and tiltable normally through an operating range including a position of initial frictional engagement with the races and a full load position in which said grippers wedgingly couple said races, a pair of relatively movable cages, means defining openings through said cages including substantially flat and parallel peripherally facing surfaces on each cage extending completely therethrough, radially spaced portions of said grippers being respectively disposed within said cage openings, and means on said grippers defining peripherally facing surfaces constructed and arranged to remain in bearing contact with said substantially flat and parallel peripherally facing cage surfaces throughout at least a major portion of the gripper tilting range whereby substantially common angular tilting movement of said grippers occurs.

35. A one-way engaging device adapted for operatively connecting a pair of concentric races having radially facing smooth annular surfaces comprising a plurality of grippers of elongate form disposed circumferentially about an axis and having peripherally facing sides and curved race-engaging surfaces, said grippers being tiltable through an operating range including a position of initial frictional engagement with the races and a full load position in which said grippers wedgingly couple the races, and means defining a plurality of pairs of peripherally spaced surfaces having a continuous sliding bearing clearance of the order of 0.002" to 0.010" with said grippers on said peripherally facing sides thereof throughout substantially their entire operating range effective to produce common angular tilting movement of said grippers throughout at least a major portion of their operating range.

36. A one-way engaging device adapted for operatively connecting a pair of concentric races having radially facing smooth annular surfaces defining an annular opening therebetween, comprising a plurality of grippers of elongate form disposed circumferentially about an axis and having peripherally facing sides and curved race-engaging surfaces, said grippers being tiltable through an operating range including a position of initial frictional engagement with the races and a full load position in which said grippers wedgingly couple the races, and means characterized by the provision of portions positionable in radial alignment with the annular opening between the annular surfaces of the races defining a plurality of pairs of peripherally spaced surfaces having a continuous sliding bearing clearance of the order of 0.002" to 0.010" with said grippers on said peripherally facing sides thereof throughout substantially their entire operating range effective to produce common angular tilting movement of said grippers throughout at least a major portion of their operating range.

References Cited in the file of this patent

UNITED STATES PATENTS

| | | |
|---|---|---|
| 2,154,212 | Moorhouse | Apr. 11, 1939 |
| 2,240,359 | Weigel | Apr. 29, 1941 |
| 2,366,842 | Dodge et al. | Jan. 9, 1945 |
| 2,366,843 | Dodge et al. | Jan. 9, 1945 |
| 2,386,013 | Swenson | Oct. 2, 1945 |
| 2,404,221 | Dodge | July 16, 1946 |
| 2,473,250 | Hoffman | June 14, 1949 |
| 2,486,603 | King | Nov. 1, 1949 |
| 2,630,896 | Dodge | Mar. 10, 1953 |
| 2,677,449 | Wavak | May 4, 1954 |

U. S. DEPARTMENT OF COMMERCE
PATENT OFFICE

CERTIFICATE OF CORRECTION

Patent No. 2,824,636                      February 25, 1958

Harry P. Troendly et al.

It is hereby certified that error appears in the printed specification of the above numbered patent requiring correction and that the said Letters Patent should read as corrected below.

Column 9, line 61, for "10" read -- 20 --; column 10, line 47, for "cloesd" read -- closed --; column 14, line 69, for "and being in" read -- and there being --; column 18, line 67, after "means" insert -- being constructed and arranged so that adjacent ones of --; column 18, lines 69 and 70, strike out "being constructed and arranged so that adjacent ones of said surfaces cooperate during tilting movements of said".

Signed and sealed this 27th day of May 1958.

(SEAL)

Attest:

KARL H. AXLINE

Attesting Officer

ROBERT C. WATSON
Commissioner of Patents